(12) United States Patent
Hua et al.

(10) Patent No.: US 6,477,706 B1
(45) Date of Patent: Nov. 5, 2002

(54) CABLE TELEVISION SYSTEM USING TRANSCODING METHOD

(75) Inventors: Van T. Hua, San Jose, CA (US); Pedro A. Assuncao, Leiria (PT)

(73) Assignee: Cogent Technology, Inc., Santa Cruz, CA (US)

(*) Notice: Subject to any disclaimer, the term of this patent is extended or adjusted under 35 U.S.C. 154(b) by 0 days.

(21) Appl. No.: 09/301,077

(22) Filed: Apr. 28, 1999

Related U.S. Application Data

(60) Provisional application No. 60/083,838, filed on May 1, 1998, provisional application No. 60/083,818, filed on May 1, 1998, and provisional application No. 60/083,816, filed on May 1, 1998.

(51) Int. Cl.[7] .......................... H04N 7/173; H04N 7/12
(52) U.S. Cl. ...................... 725/96; 725/95; 375/240.27
(58) Field of Search ................ 375/240.27; 725/95, 725/96

(56) References Cited

U.S. PATENT DOCUMENTS

| | | | |
|---|---|---|---|
| 5,151,875 A | 9/1992 | Sato | |
| 5,191,548 A | 3/1993 | Balkanski et al. | |
| 5,196,946 A | 3/1993 | Balkanski et al. | |
| 5,253,078 A | 10/1993 | Balkanski et al. | |
| 5,270,832 A | 12/1993 | Balkanski et al. | |
| 5,309,567 A | 5/1994 | Mizukami | |
| 5,341,318 A | 8/1994 | Balkanski et al. | |
| 5,379,356 A | 1/1995 | Purcell et al. | |
| 5,423,010 A | 6/1995 | Mizukami | |
| 5,537,440 A | 7/1996 | Eyuboglu et al. | |
| 5,541,852 A | 7/1996 | Eyuboglu et al. | |
| 5,544,266 A | 8/1996 | Koppelmans et al. | |
| 5,568,167 A | 10/1996 | Galbi et al. | |
| 5,596,376 A | 1/1997 | Howe | |
| 5,604,540 A | 2/1997 | Howe | |
| 5,608,656 A | 3/1997 | Purcell et al. | |
| 5,608,888 A | 3/1997 | Purcell et al. | |
| 5,623,312 A | 4/1997 | Yan et al. | |
| 5,630,033 A | 5/1997 | Purcell et al. | |
| 5,633,687 A | 5/1997 | Bhayani et al. | |
| 5,650,860 A | 7/1997 | Uz | |
| 5,686,963 A | 11/1997 | Uz et al. | |
| 5,729,293 A | 3/1998 | Keesman | |
| 5,764,298 A | 6/1998 | Morrison | |
| 5,768,535 A | 6/1998 | Chaddha et al. | |
| 5,793,415 A | 8/1998 | Gregory, III et al. | |
| 5,796,434 A | 8/1998 | Lempel | |
| 5,805,220 A | 9/1998 | Keesman et al. | |
| 5,835,495 A | 11/1998 | Ferriere | |
| 5,870,146 A | 2/1999 | Zhu | |
| 5,903,312 A | 5/1999 | Malladi et al. | |
| 5,917,830 A | 6/1999 | Chen et al. | |
| 5,940,130 A * | 8/1999 | Nilsson et al. | 348/416 |
| 6,014,693 A * | 1/2000 | Ito et al. | 709/219 |

(List continued on next page.)

Primary Examiner—John Miller
Assistant Examiner—Annan Q Shang
(74) Attorney, Agent, or Firm—Townsend and Townsend and Crew LLP

(57) ABSTRACT

The present invention provides a telecommunication. The present provides a method for editing a first digital signal such as a constant bit rate digital signal in a cable head end. The present method uses a step of providing a first constant bit rate information stream (e.g., multiple constant bit rate streams), where the first constant bit rate stream includes a plurality of variable bit rate streams. Each of the variable bit rate streams correspond to a program, e.g., television program. The method removes one or more of the variable bit rate streams from the first constant bit rate stream, and converts the first constant bit rate stream without the one or more variable bit rate streams into a second constant bit rate stream. A step of transferring the second constant bit rate stream to a user location is included. The present invention uses a transcoding technique to edit the first constant bit rate stream without interfering with video picture quality at the user location.

12 Claims, 8 Drawing Sheets

U.S. PATENT DOCUMENTS

| | | |
|---|---|---|
| 6,041,068 A | 3/2000 | Rosengren et al. |
| 6,058,143 A | 5/2000 | Golin |
| 6,081,295 A | 6/2000 | Adolph et al. |
| 6,125,140 A | 9/2000 | Wilkinson |
| 6,181,711 B1 * | 1/2001 | Zhang et al. ............... 370/468 |
| 6,212,189 B1 * | 4/2001 | Petty .......................... 370/395 |
| 6,215,824 B1 | 4/2001 | Assuncao |
| 6,226,327 B1 | 5/2001 | Assuncao |
| 6,233,226 B1 * | 5/2001 | Gringeri et al. ............ 370/252 |

* cited by examiner

CABLE TELEVISION SYSTEM USING TRANSCODING METHOD

CROSS-REFERENCES TO RELATED APPLICATIONS

This application claims priority to U.S. Provisional Application Nos. 60/083,816, 60/083,838, and 60/083,818, all filed on May 1, 1998, hereby incorporated by reference for all purposes.

BACKGROUND OF THE INVENTION

The present invention relates generally to cable television systems. More particularly, the present invention provides an improved transmission technique, including a method, for editing digital video signals that can be used in a cable television network. Merely by way of example, the present invention can also be applied to a variety of other applications such as data broadcasting, digital TV broadcasts, Internet, and ADSL network switching, and other related information transmission techniques.

Conventional television delivery systems have been designed to deliver analog video/audio signals from a signal source to viewer television sets at numerous user locations. Conventional analog cable television delivery systems typically operate with an analog cable converter box in the viewer home which uses a television to display commonly known cable television programs such as HBO™, ShowTime™, and others. The converter box is connected via cable to an analog cable head end site, which often services a selected geographic region. Each analog cable head end site often has multiple satellite dishes, which normally receive transponded signals from one or more satellites. A satellite may have multiple satellite transponders that provide a group of viewer channels or programs to the head end. Although up link sites and satellite dishes can transmit and receive multiple video/audio program signals, some conventional satellite transponders generally carry only a single video/audio program at any given time. There is also generally one Integrated Receiver and Decoder per transponder (or channel) at the analog cable head end to receive the signal from the transponder.

Accordingly, conventional analog technology often requires a combination of one uplink site, one satellite transponder, and one cable head end satellite dish to deliver each analog video/audio program to the cable head end. The cable head end uses several analog video/audio signals from multiple dishes and multiple transponders to provide multi-channel analog signals. The cable head end then transmits these analog signals on different transmission frequencies to the cable converter boxes in the viewer homes where one channel is selected by the viewer. Accordingly, the viewer can selected programs such as those noted above (e.g., HBO™), but can also be others. Each television channel for analog video/audio transmissions for television is in a 6 MHz segment of bandwidth. An industry standard of 6 MHz was set in the late 1930's and the NTSC standard is still 6 MHz per channel of analog video. As television program delivery technology moves from analog into the digital world, the conventional 6 MHz segments have no real technical significance, except in hybrid analog-digital converters.

In some selected geographic regions, digital video/audio systems to distribute digital video/audio have been used or proposed. Many of these system are based, in part, upon a standard made by the International Organization For Standardization ("ISO"). This standard is commonly called the MPEG-2 protocol for combining one or more "elementary streams" of coded video, audio, or other data into a single bitstream suitable for transmission. The MPEG-2 standard provides a common syntax and set of semantic rules for the construction of bitstreams containing a multiplexed combination of one or more "programs," where the program is often composed of one or more related elementary streams, e.g., video, audio. Accordingly, it is possible to distribute digital video/audio signals to users using conventional digital video systems.

These conventional digital video systems, however, still have numerous limitations. As merely an example, conventional digital video systems do not generally have any effective editing capabilities. That is, digital video/audio signals derived from a cable television provider cannot easily be edited at, for example, a head end location. Additionally, some digital video systems do not have any local network information such as local stations and the like. Although these digital video systems may be useful in providing a user with a clear digital video signal for "cable" programs such as HBO™ or ShowTime™, they simply cannot and do not provide channels for location contents through the digital video system. Furthermore, most conventional digital video systems cannot provide "real time" editing capabilities without substantially interfering with the quality of the resulting video image. Some of these conventional cable systems also have constant bit rate information streams that are composed of variable bit rate stream that are often difficult or even impossible to edit using conventional technology. These and other limitations are described throughout the present specification, and more particularly below.

From the above, it can be seen that a cost effective, device for manipulating cable television signals is often desirable.

SUMMARY OF THE INVENTION

The present invention provides techniques for improved digital video transmission. More particularly, the present invention provides a method for editing video/audio information for a cable television system.

In a specific embodiment, the present invention provides a method for editing a first digital signal such as a constant bit rate digital signal in a cable head end. The present method uses a step of providing a first constant bit rate information stream (e.g., multiple constant bit rate streams), where the first constant bit rate stream includes a plurality of variable bit rate streams. Each of the variable bit rate streams corresponds to a program, e.g., television program. The method removes one or more of the variable bit rate streams from the first constant bit rate stream, and converts the first constant bit rate stream, without the one or more variable bit rate streams, into a second constant bit rate stream. A step of transferring the second constant bit rate stream to a user location is included. The present invention uses a transcoding technique to edit the first constant bit rate stream without interfering with video picture quality at the user location.

According to an embodiment of the present invention, the present method uses a technique for transcoding an input elementary stream such as the first constant bit rate stream. The method includes a variety of steps such as providing the input elementary stream such as the one noted, but can be others. A step of separating an input elementary stream into transform coefficients and their associated motion vectors is included. The method then includes steps of dequantizing the transform coefficients to form block transform coefficients, and determining a compensation stream using a feedback path. The method combines the compensation stream from the feedback path with the block transform coefficients to form a corrected stream. The correlated stream is reduced to form an output stream having a characteristic data rate different from the characteristic data rate of the input stream. The combination of these steps can provide a resultant digital video signal from the input stream.

In an alternative aspect, the present invention uses an editing method for transcoding one or more elementary streams, such as the first constant bit rate stream, having a characteristic input data rate in order to form an output elementary stream having an output data rate. The method includes a variety of steps such as separating the input elementary stream into motion vectors and transformation coefficients. An inverse quantization is performed on the transform coefficients to form block transform coefficients. A corrected stream is formed by summing the block transform coefficients with a compensation stream formed in a feedback loop. The corrected stream is reduced to form an output stream having a characteristic data rate equal to the target output data rate. An error representation is generated from dequantizing the output stream to form a second set of block transform coefficients, and then combining the block transform coefficients with the second set of block transform coefficients to form the error representation. The error representation is converted to a time domain representation. An error accumulation of successive frames is selectively computed by selecting a subset in both frames using the motion vectors and computing the error between these subsets. The error accumulation is converted to the compensation stream for feedback. Finally, the output stream and the motion vectors are combined to form the output elementary stream.

In a further embodiment, the present invention provides a method for editing a first constant bit rate signal using transcoding an input digital signal, such as the first constant bit rate stream, having an input data rate to form an output digital signal having an output data rate. The method includes a variety of steps such as separating the input digital signal to obtain a first transformed signal and a plurality of motion information. A step of correcting the first transformed signal with a compensation signal to generate a corrected signal is also included. The method then includes the steps of reducing the corrected signal to generate a second transformed signal and then generating an error signal based on the first transformed signal and the second transform signal, where the compensation signal is generated based upon the error signal and the motion information. The method then combines the second transformed digital signal and the motion information to form the output digital signal.

Still further, the present invention provides an editing method using transcoding an input digital signal (e.g., first constant bit rate stream) having an input data rate to form an output digital signal (e.g., second constant bit rate stream) having an output data rate. The method includes a variety of steps such as separating the input digital signal into a first transformed signal and a plurality of motion information. The method also includes the step of reducing the first transformed signal to form a second transformed signal having the output data rate. The method also includes the step of generating the output digital signal from the second transformed signal and the plurality of motion information.

Numerous benefits are achieved by way of the present invention over conventional techniques. In some embodiments, the present invention provides a method that is cost effective and can be implemented using relatively conventional hardware and software components. In other embodiments, the present invention can provide a resulting digital video/audio output that has been edited to provide the user a group of program channels that are desirable to the user. Furthermore, the present invention provides a transcoding technique to edit and insert local contents into the stream of information to be output to a user location in yet further embodiments. Depending upon the embodiment, the above benefits, as well as others, can be present in one or more embodiments. Each embodiment can also have one or more of the noted benefits, as well as others. These and other benefits are described throughout the present specification and more particularly below.

The invention will be better understood upon reference to the following detailed description and its accompanying drawings.

DESCRIPTION OF THE SPECIFIC EMBODIMENTS

Conventional Analog Head End System

Figure 1:
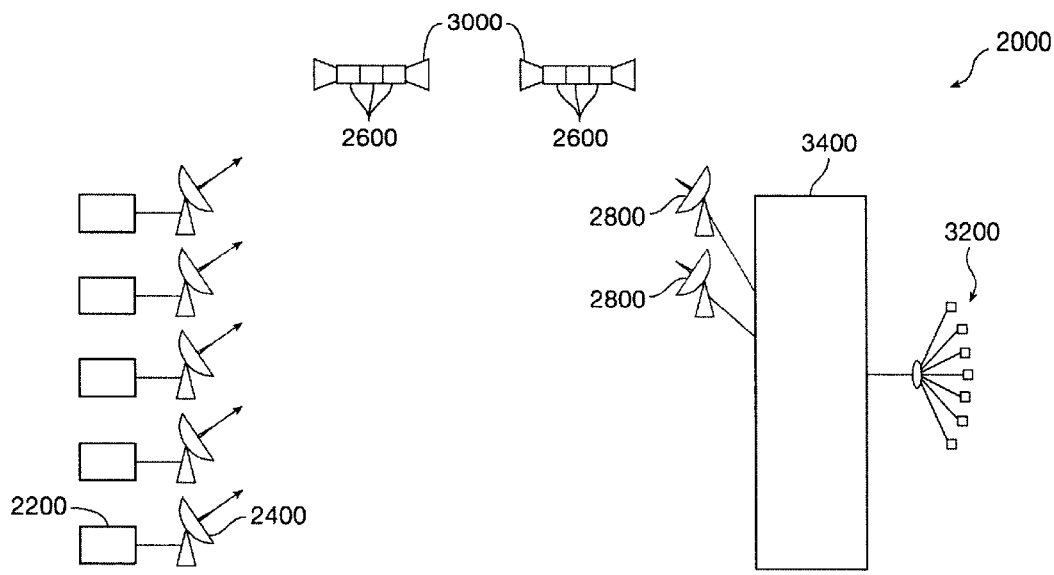
FIG. 1 is a simplified diagram of a conventional cable television system.

FIG. 1 shows an overview of a conventional analog cable television delivery system 2000. In particular, the system 2000 includes one analog television program source 2200 uplinked by each satellite transmitter dish 2400 to one or more satellite transponders 2600, and each satellite receiver dish 2800 receiving transponded signals from one satellite 3000. In the analog system, each satellite 3000 has multiple transponders 2600. Each transponder is often only capable of handling a single analog television program at a time. The received analog television program signals are generally combined by the cable head end 3400 and routed to the concatenated cable system 3200. The one program per transponder limitation of the analog television delivery system is often a limitation of conventional analog systems.

Present Digital Cable Systems 1.0 System Overview

Figure 2:
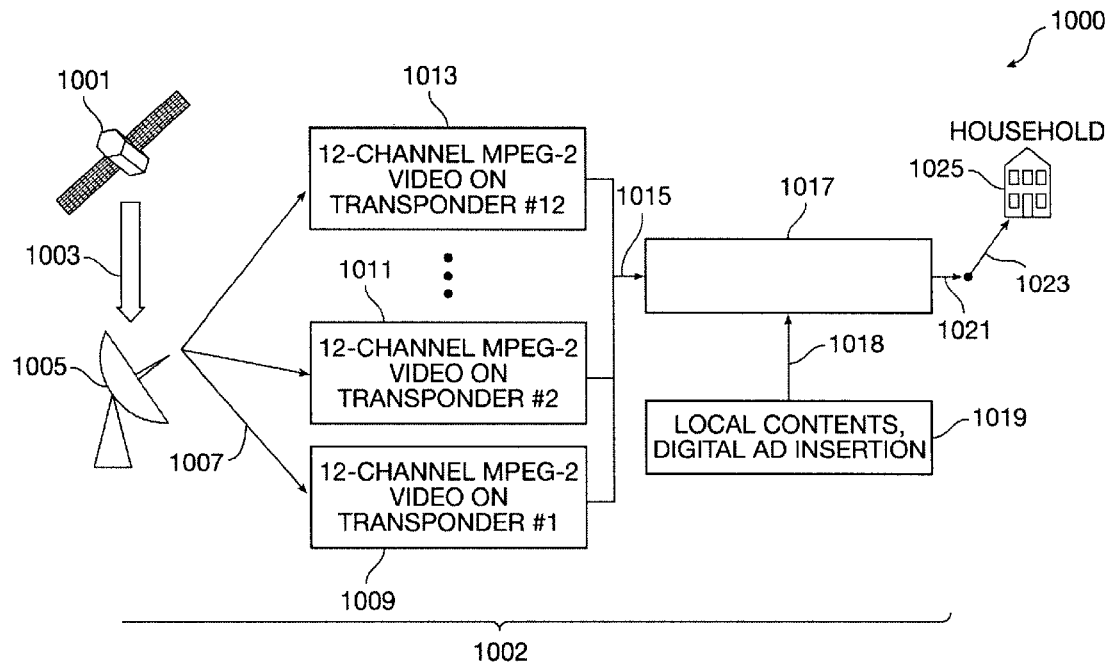
FIG. 2 is a simplified diagram of a cable television system according to an embodiment of the present invention.

FIG. 2 is a simplified diagram of a cable television system 1000 according to an embodiment of the present invention. This diagram is merely an illustration and should not limit the scope of the claims herein. One of ordinary skill in the art would recognize other variations, modifications, and alternatives. The present cable system 1000 includes, among other elements, one or more satellites 1011, which can include one or more transponders. These transponders transmit one more multiple constant bit rate streams 1003 of information to a cable head end operation 1002. The cable head end operation 1002 uses a satellite dish 1005 or multiple satellite dishes to receive the information from the satellite. That is, the dish receives the multiple constant bit rate streams of information from the transponder(s).

In a specific embodiment, each of the transponders can provide a constant bit rate stream of information to the head end operation. Each constant bit rate stream generally is made of a plurality of variable bit rate streams, where each of the variable bit rate streams correspond to a television program, for example. Alternatively, a constant bit rate stream can be combined with the variable bit rate streams in other embodiments. In certain embodiments, each of the constant bit rate streams include at least twelve variable bit rate streams or twelve MPEG-2 video streams, as shown. Transponder 1 1009 includes a 12-channel MPEG-2 video. Transponder 2 1011 includes a 12-channel MPEG-2 video. The other transponders, including transponder 12, also each include a 12-channel MPEG-2 video.

Each of the 12-channel MPEG-2 video streams feeds into a hub device 1017. Hub device 1017 performs a variety of editing operations according to embodiments of the present invention. At a high level, hub device can remove one of the variable bit rate channels from one of the 12-channel MPEG-2 video streams, reformat the 12-channel MPEG-2 video stream, and transmit it 1021 out of the head end through a cable 1023 or cable network to a user location 1025. Alternatively, the hub device can insert a local content 1019 into an outgoing video stream 1021. According to the present invention, the hub device can perform these editing operations without interfering or detrimentally influencing the quality of the picture or sound that outputs at the user location. The present invention achieves high quality video and/or audio at the user location by way of a transcoding and remultiplexing technique. The transcoding technique, including related hardware and process, is described in detail with reference to the Figs. below.

2.0 Hardware Overview

Figure 3:
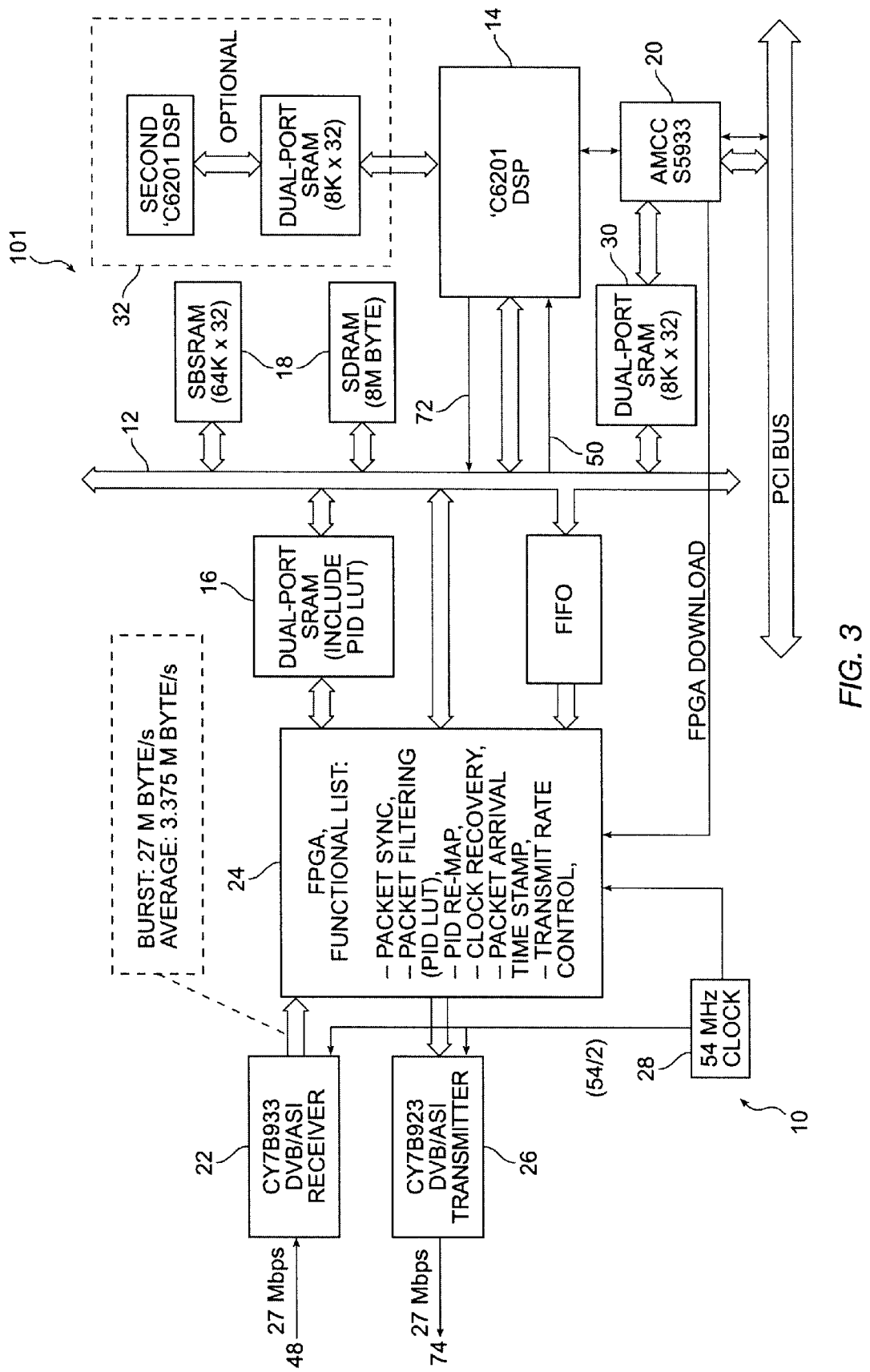
FIG. 3 depicts a simplified block diagram of a representative hardware embodiment according to an embodiment of the invention.

FIG. 3 depicts a simplified hardware block diagram 101 of a signal processing hardware in a particular embodiment according to the invention. In the representative system of FIG. 3, a processing unit 10 includes at least one bus 12, which is shown schematically as a single bus, but can also be a number of buses such as a local bus and one or more expansion buses (e.g., ADB, SCSI, ISA, EISA, MCA, NuBus, or PCI), which interconnects subsystems such as a processor 14, which in alternative embodiments may be a microcomputer, microcontroller or logic, but which preferably is a signal processor such as a C6201 or other suitable signal processor family, a dual ported image memory 16, which is preferably an SRAM, system memory 18 which may be RAM, ROM or a combination thereof, a bus interface 20, in conjunction with dual ported SRAM 30, for interconnecting processing unit 10 with a host processor.

Input processing is performed by a receiver 22 for receiving an input stream 48, a programmable logic unit 24, which may be a processor, programming logic or a functional programmable gate array (FPGA), operatively disposed to provide synchronization of incoming packets, filtering of incoming packets based upon packet header information, recovery of clock information within headers of incoming packets and time stamping of input packets, in conjunction with clock means 28. Output processing of output stream 74 is controlled by transmitter 26 connected to programmable logic unit 24.

Other devices or subsystems (not shown) may be connected in a similar manner. Also, the devices and subsystems may be interconnected in different ways, and many of the devices shown need not be present, without impairing the operation of the system. Source code to implement processing functions in accordance with the present invention may be operably disposed in system memory 18 or stored on storage media. Optionally, multiple signal processing units may be coupled together, such as optional signal processing unit 32.

3.0 Data Transcoding

A plurality of techniques may be used for transcoding elementary Streams. One technique, called open loop transcoding, provides methods of minimal transcoder complexity. One loop methods modify only encoded DCT coefficients in order to reduce the overall bit rate. A disadvantage inherent to open loop methods is that image drift introduced by the accumulation of errors in the decoder loop of these methods over multiple predicted frames (P) results in a continuous drop in picture quality. This accumulated drift error is reset to zero whenever an intra (I) frame is decoded. Instances where the transcoding error introduced in each frame is small, total distortion becomes noticeable after decoding a long string of predicted frames. Otherwise, the distortion will be noticeable after only a few frames.

Requantization methods attempt to achieve bit-rate reduction of encoded video by quantizing Discrete Cosine Transform (DCT) coefficients with a larger quantization step size. A "quantization" process weights each element of an image pixel matrix in accordance with its chrominance or luminance type and its frequency. In an intra frame (I) picture, the quantization weights are intended to reduce to one many high frequency components to which the human eye is not sensitive. In predicted (P) and bidirectional (B) pictures, which contain mostly higher frequency components, the weights are not related to visual perception. "Requantizing" or "reducing" with a larger step size results in bit rate reduction since by applying a coarser quantization, more coefficients will become zero, in turn requiring fewer variable length codes (VLC) to encode the new quantized coefficients.

Data partitioning methods may be implemented by eliminating from the DCT coefficients a subset of them according to a selected strategy. For example, discarding all coefficients below a certain threshold level (threshold sampling), or discarding the coefficients above a certain frequency (zonal sampling). The threshold can be varied to achieve a target bit rate. As applied to digital video, data partitioning is performed by establishing a priority breakpoint (PBP), such that information having a priority below the PBP is discarded, while information above the PBP is retained.

Closed loop transcoding employs a re-encoding system which fully decodes the input bit stream into the pixel domain, then subsequently encodes it again at a lower bit rate. Feedback may be used to correct transcoding distortion so that the distortion does not propagate into the successive frames. Closed loop techniques are effective, however they are also complex and costly.

Figure 4A:
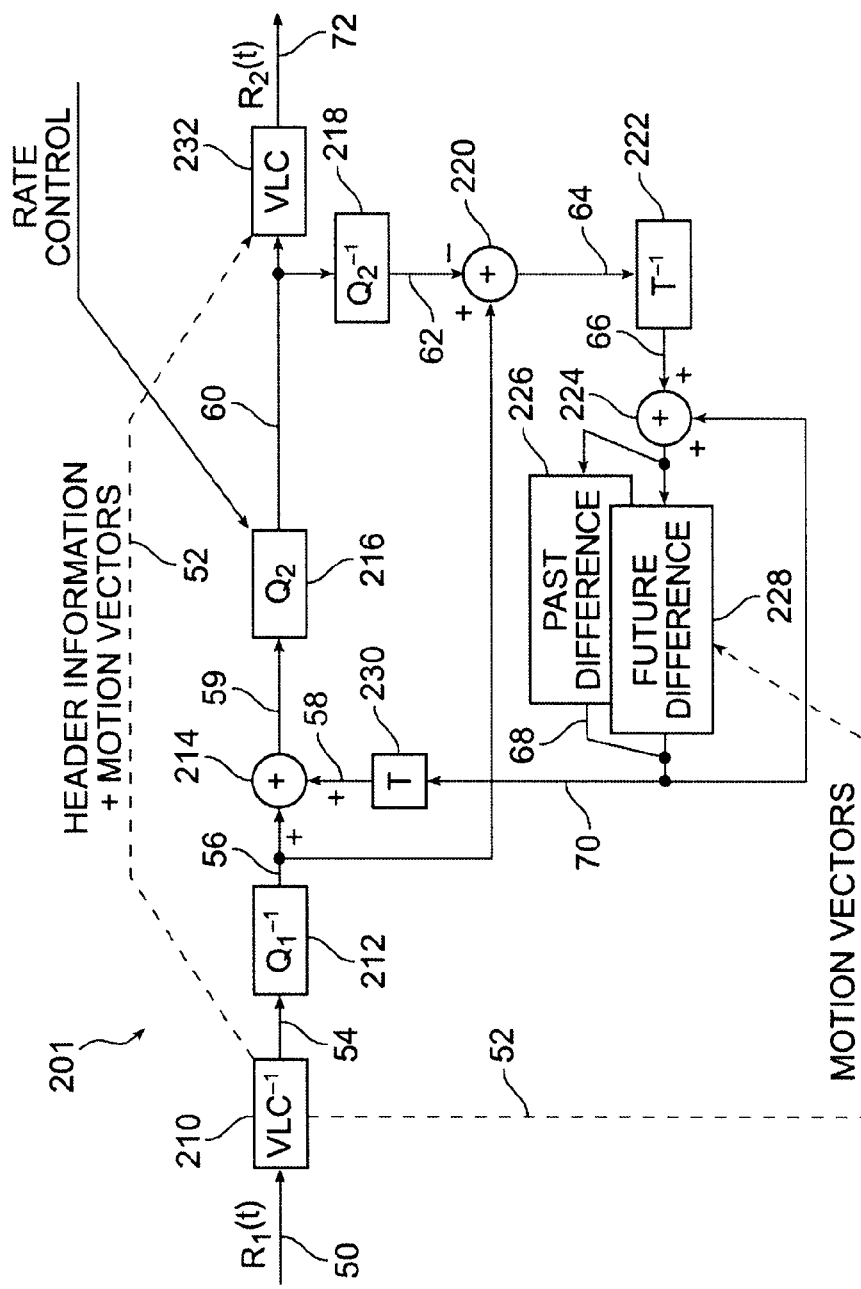
FIGS. 4A–4C depict simplified process block diagrams for representative transcoding processes according to various specific embodiments of the invention.

FIG. 4A depicts a simplified process block diagram 201 of the processes incorporated into various components in a particular embodiment according to the invention for transcoding an input elementary stream 50 into an output elementary stream 72 operatively disposed in SDRAM 16 and executed by processor 14 of FIG. 3. Variable length coding (VLC) decoder 210 extracts motion vectors 52 and a plurality of transform coefficients 54 from the input elementary stream 50. In one embodiment the transform coefficients are discrete cosine transform (DCT) coefficients. Inverse quantizer 212 converts the transform coefficients 54 to block transform coefficients 56. Summer 214 combines the block transform coefficients 56 with a compensation stream 58, generated by a feedback path, to form a corrected stream 59. Quantizer 216 reduces corrected stream 59 to a target output data rate to form an output stream 60. Inverse quantizer 218 converts the output stream 60 to form a second plurality of block transform coefficients 62. Summer 220 combines the second plurality of block transform coefficients 62 with the plurality of block coefficients 56 forming an error representation 64. Inverse DCT 222 converts error representation 64 to a first time domain representation 66. Summer 224, frame buffer 226 and frame buffer 228 enable the selective computation of an error accumulation 68 between two successive image frames in accordance with motion vectors 52 in order to determine a one frame delay 70. DCT transform 230 converts one frame delay 70 to compensation stream 58. Variable length coder 232 converts the output stream 60 and motion vectors 52 to output elementary stream 72.

Figure 4B:
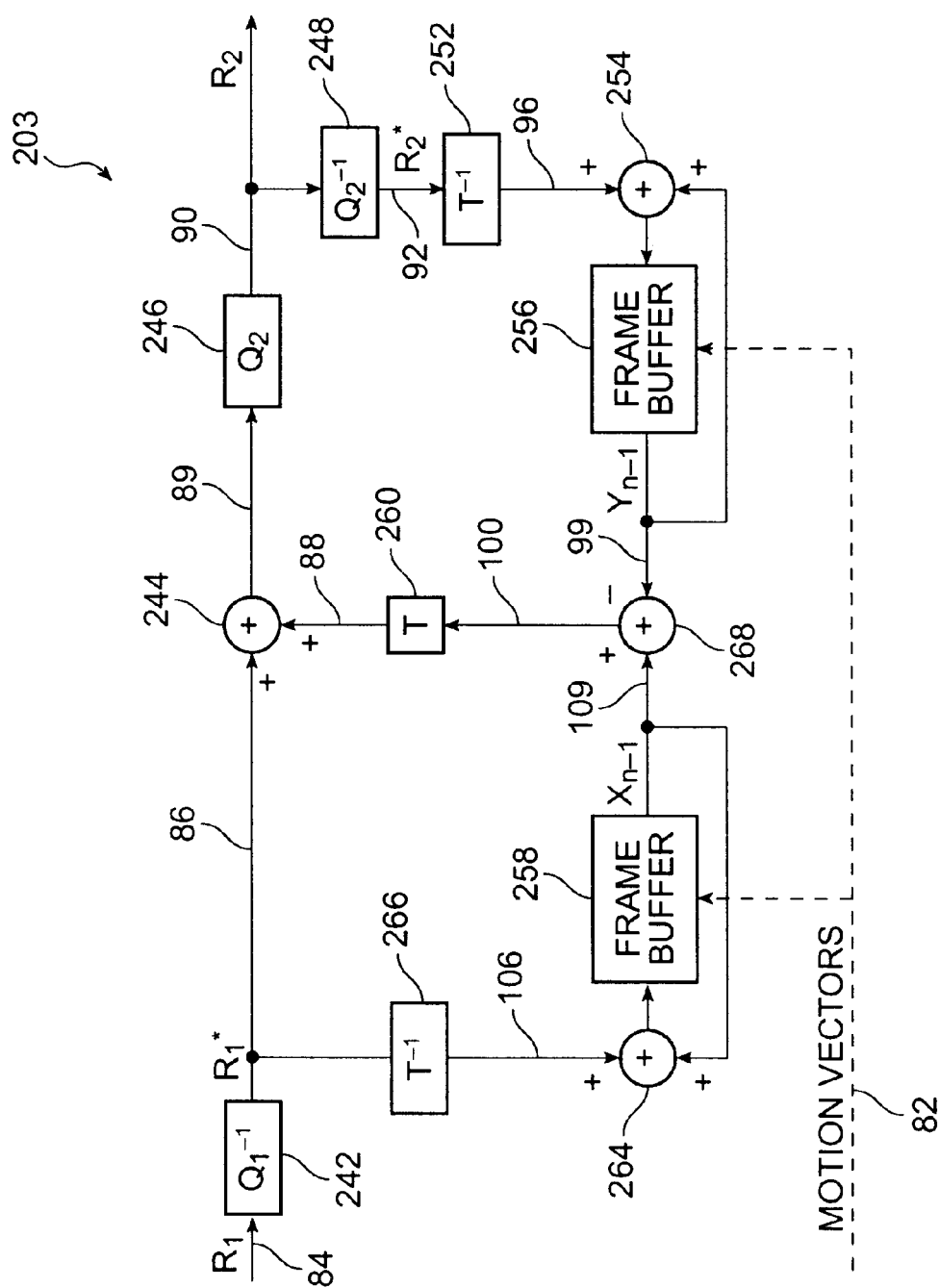

FIG. 4B depicts a simplified process block diagram 203 of the processes incorporated into various components in an alternative embodiment according to the invention for transcoding an input elementary stream 50 into an output elementary stream 72 operatively disposed in SDRAM 16 and executed by processor 14 of FIG. 3. Variable length coding (VLC) decoder 210 (not shown) extracts motion vectors 82 and a plurality of transform coefficients 84 from the input elementary stream 50. In one embodiment the transform coefficients are discrete cosine transform (DCT) coefficients. Inverse quantizer 242 converts the transform coefficients 84 to block transform coefficients 86. Summer 244 combines the block transform coefficients 86 with a compensation stream 88, generated by a feedback path, to form a corrected stream 89. Quantizer 246 reduces corrected stream 89 to a target output data rate to form an output stream 90. Inverse quantizer 248 converts the output stream 90 to form a second plurality of block transform coefficients 92. Inverse DCT 252 converts second plurality of block transform coefficients 92 to a first time domain representation 96. Summer 254, frame buffer 256 compute a first one frame delay 99 from two successive image frames in accordance with motion vectors 82. Meanwhile, Inverse DCT 266 converts block transform coefficients 86 to a second time domain representation 106. Summer 264, frame buffer 258 compute a second one frame delay 109 from two successive image frames in accordance with motion vectors 82. Summer 268 combines the first one frame delay 99 and the second one frame delay 109 to form a combined one frame delay 100. DCT transform 260 converts combined one frame delay 100 to compensation stream 88. Variable length coder 262 (not shown) converts the output stream 90 and motion vectors 82 to output elementary stream 72.

Figure 4C:
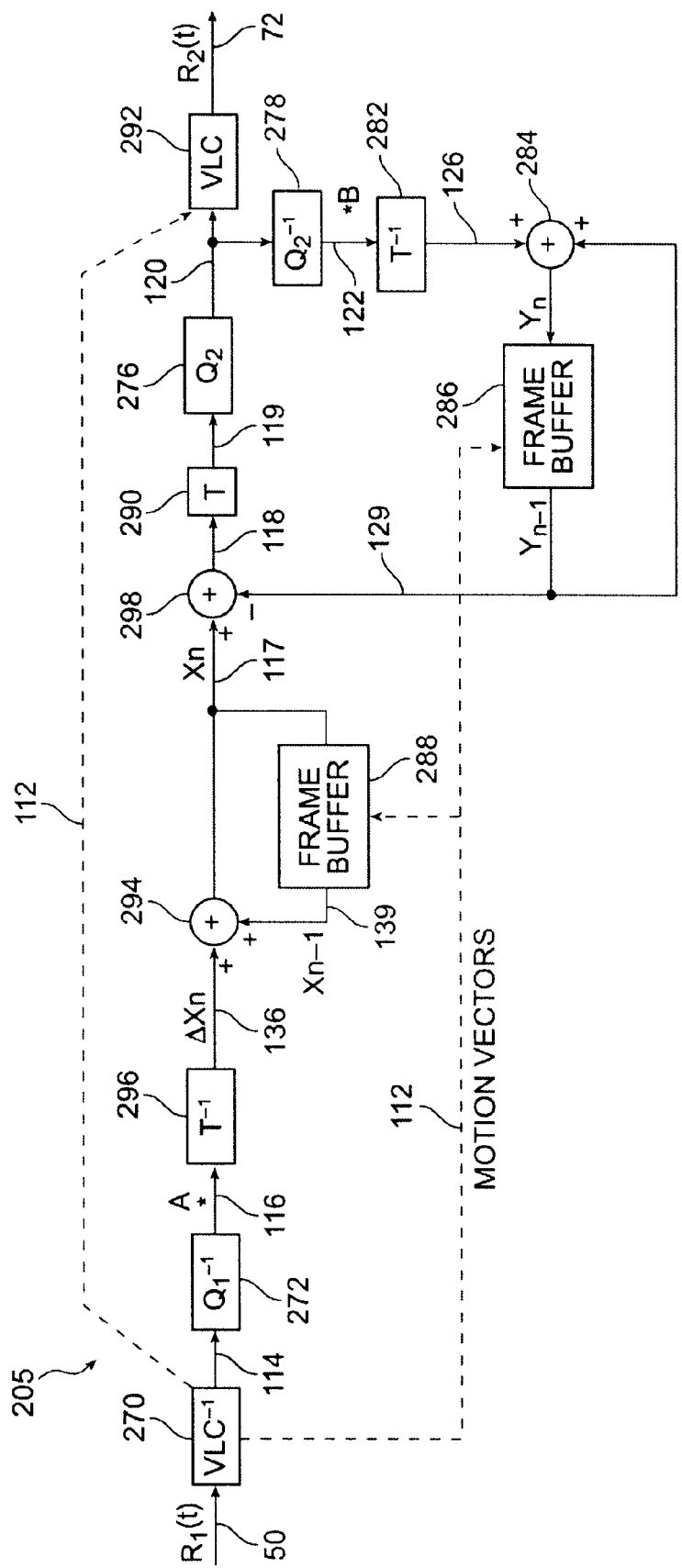

FIG. 4C depicts a simplified process block diagram 205 of the processes incorporated into various components in another alternative embodiment according to the invention for transcoding an input elementary stream 50 into an output elementary stream 72 operatively disposed in SDRAM 16 and executed by processor 14 of FIG. 3. Variable length coding (VLC) decoder 270 extracts motion vectors 112 and a plurality of transform coefficients 114 from the input elementary stream 50. In one embodiment the transform coefficients are discrete cosine transform (DCT) coefficients. Inverse quantizer 272 converts the transform coefficients 114 to block transform coefficients 116. Inverse DCT 296 converts block transform coefficients 116 to a second time domain representation 136. Frame buffer 288 computes a second one frame delay 139 from two successive image frames in accordance with motion vectors 112. Summer 294 adds the second one frame delay 139 to the second time domain representation 136 to form a decoded video stream 117. Summer 298 combines the decoded video stream 117 with a first one frame delay 129 to form a corrected stream 118. DCT transform 290 converts corrected stream 118 to a second frequency stream 119. Quantizer 276 reduces second frequency stream 119 to a target output data rate to form an output stream 120. Inverse quantizer 278 converts the output stream 120 to form a second plurality of block transform coefficients 122. Inverse DCT 282 converts second plurality of block transform coefficients 122 to a first time domain representation 126. Summer 284, frame buffer 286 compute the first one frame delay 129 from two successive image frames in accordance with motion vectors 112. Variable length coder 292 converts the output stream 120 and motion vectors 112 to output elementary stream 72.

4.0 Process

Figure 5A:
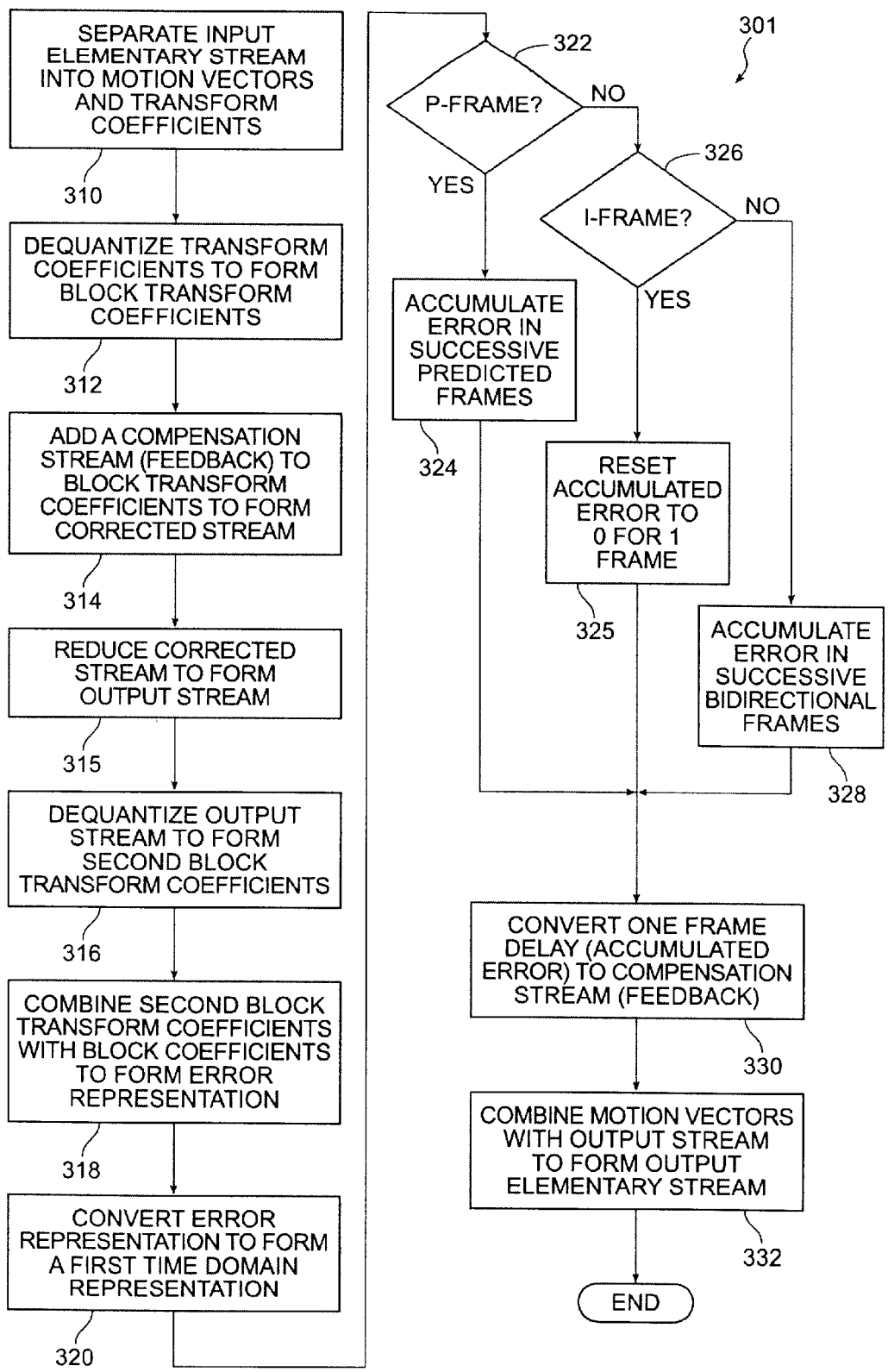
FIGS. 5A–5C depict simplified flowcharts of representative process steps according to various specific embodiments of the invention.

FIG. 5A depicts a flowchart 301 of simplified process steps incorporated into various components in a particular representative embodiment according to the invention for transcoding an input elementary stream having a plurality of image frames, some of which may be intra frames (I), predicted frames (P) or bidirectional frames (B), into an output elementary stream having a characteristic data rate which is different from the input elementary stream. In a step 310, input elementary stream 50 is separated into a plurality of motion vectors 52 and a plurality of transform coefficients 54. In one embodiment the transform coefficients are discrete cosine transform (DCT) coefficients. Next, in a step 312, the transform coefficients 54 are dequantized to form a plurality of block transform coefficients 56. A feedback path is used to generate and apply an error representation 64 from the output to the input beginning with a step 314, the plurality of block transform coefficients 56 is added to a compensation stream 58, formed in a step 330 below, to form a corrected stream 59. In a step 315, the corrected stream formed in step 314 is reduced at a quantization level selected to conform the characteristic data rate of to the desired output data rate to form an output stream 60. Next, in a step 316, the output stream 60 is dequantized to form a second plurality of block transform coefficients 62. Then, in a step 318, second plurality of block transform coefficients 62 is combined with the plurality of block transform coefficients 56 produced in step 312 to form the error representation 64. In a step 320, error representation 64 is converted into a first time domain representation 66. Then in a decisional step 322, if the frame is a predicted frame (P), then in a step 324, an error accumulation computation is applied to a first frame in the first time domain representation 66 and a second frame in the first time domain representation 66, to compute error accumulation 68 by selecting a subset in the first frame and a subset in the second frame using the motion vectors separated in step 310, computing an error accumulation between the first subset and the second subset, and thereupon continuing to the next subset until error accumulation 68 has been calculated. Otherwise, if in step 322, it was determined that the frame is not a predicted (P) frame, then in a decisional step 326, if the frame is an intra (I) frame then in a step 325, error accumulation 68 is reset to zero. Otherwise, if in step 326, it was determined that the frame was not an intra (I) frame, then it must be a bidirectional frame (B). In a step 328, computation is applied in a bidirectional frame to a second frame in the first time domain representation 66 and a third frame in the first time domain representation 66, to compute an error accumulation 68 by selecting a subset in the second frame and a subset in the third frame using the motion vectors separated in step 310, computing an error accumulation between the first subset and the second subset, and thereupon continuing to the next subset until error accumulation 68 has been calculated. Irrespective of the frame type and error computation performed, error accumulation 68 comprises a one frame delay 70. In a step 330, one frame delay 70 is converted to the compensation stream 58. Finally, in a step 332, motion vectors 52 are combined with the output stream 60 formed in reducing step 314 to form an output elementary stream 72.

Figure 5B:
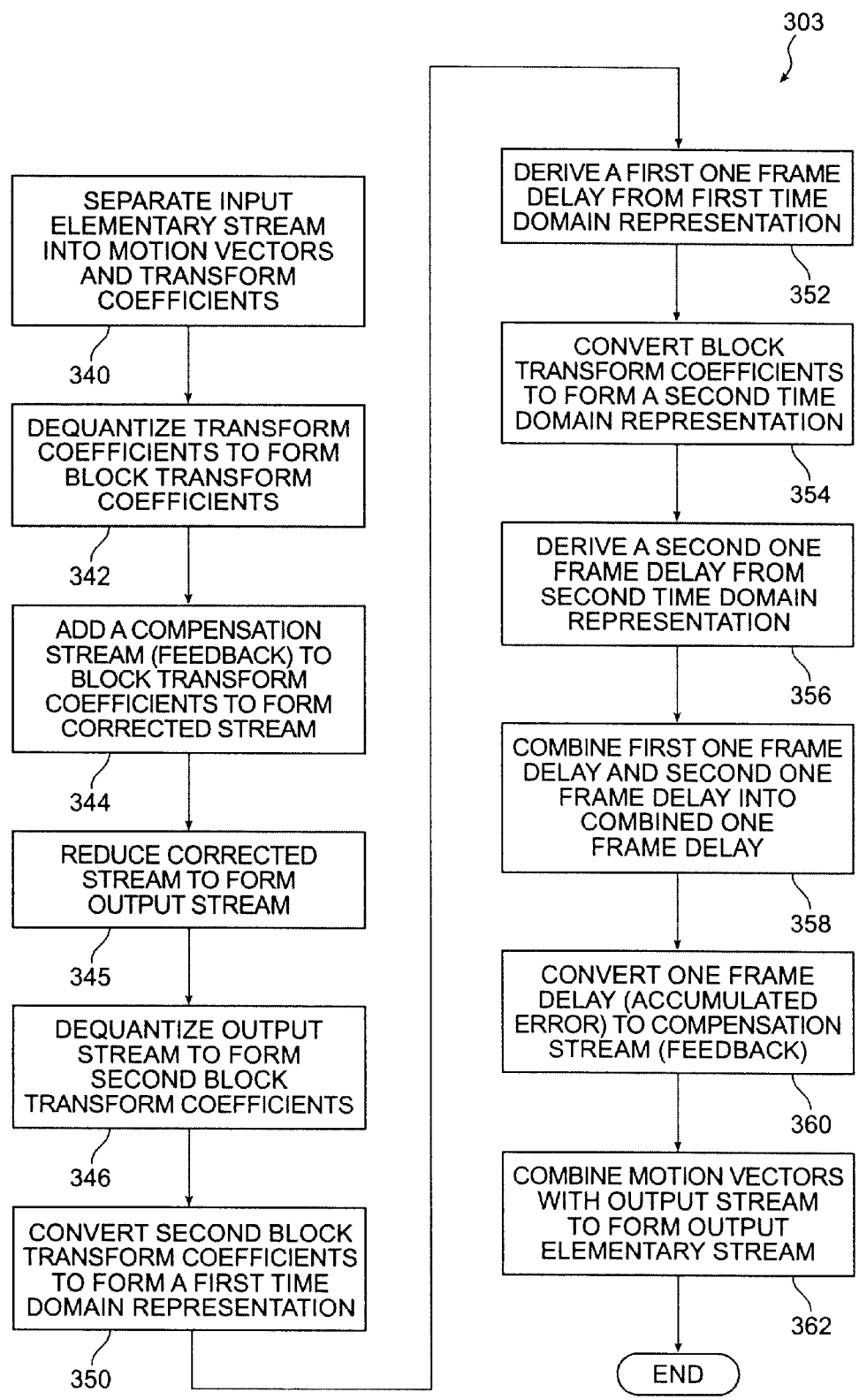

FIG. 5B depicts a flowchart 303 of simplified process steps incorporated into various components in an alternative embodiment according to the invention for transcoding an input elementary stream having a plurality of image frames, some of which may be intra frames (I), predicted frames (P) or bidirectional frames (B), into an output elementary stream having a characteristic data rate which is different from the input elementary stream. In a step 340, input elementary stream 50 is separated into a plurality of motion vectors 82 and a plurality of transform coefficients 84. In one embodiment the transform coefficients are discrete cosine transform (DCT) coefficients. Next, in a step 342, the transform coefficients 84 are dequantized to form a plurality of block transform coefficients 86. A feedback path is used to generate and apply an error representation from the output to the input beginning with a step 344, the plurality of block transform coefficients 86 is added to a compensation stream 88, formed in a step 360 below, to form a corrected stream 89. In a step 345, the corrected stream 89 formed in step 344 is reduced at a quantization level selected to conform the characteristic data rate of to the desired output data rate to form an output stream 90. Next, in a step 346, the output stream 90 is dequantized to form a second plurality of block transform coefficients 92. In a step 350, second plurality of block transform coefficients 92 is converted into a first time domain representation 96. Then, in a step 352, a first one frame delay 99 is derived from the first time domain representation 96. In a step 354, plurality of block transform coefficients 86 is converted into a second time domain representation 106. Then, in a step 356, a second one frame delay 109 is derived from the second time domain representation 106. In a step 358, the first one frame delay 99 and the second one frame delay 109 are combined to form a combined one frame delay 100. In a step 360, combined one frame delay 100 is converted to the compensation stream 88. Finally, in a step 362, motion vectors 82 are combined with the output stream 90 formed in reducing step 344 to form an output elementary stream 72.

Figure 5C:
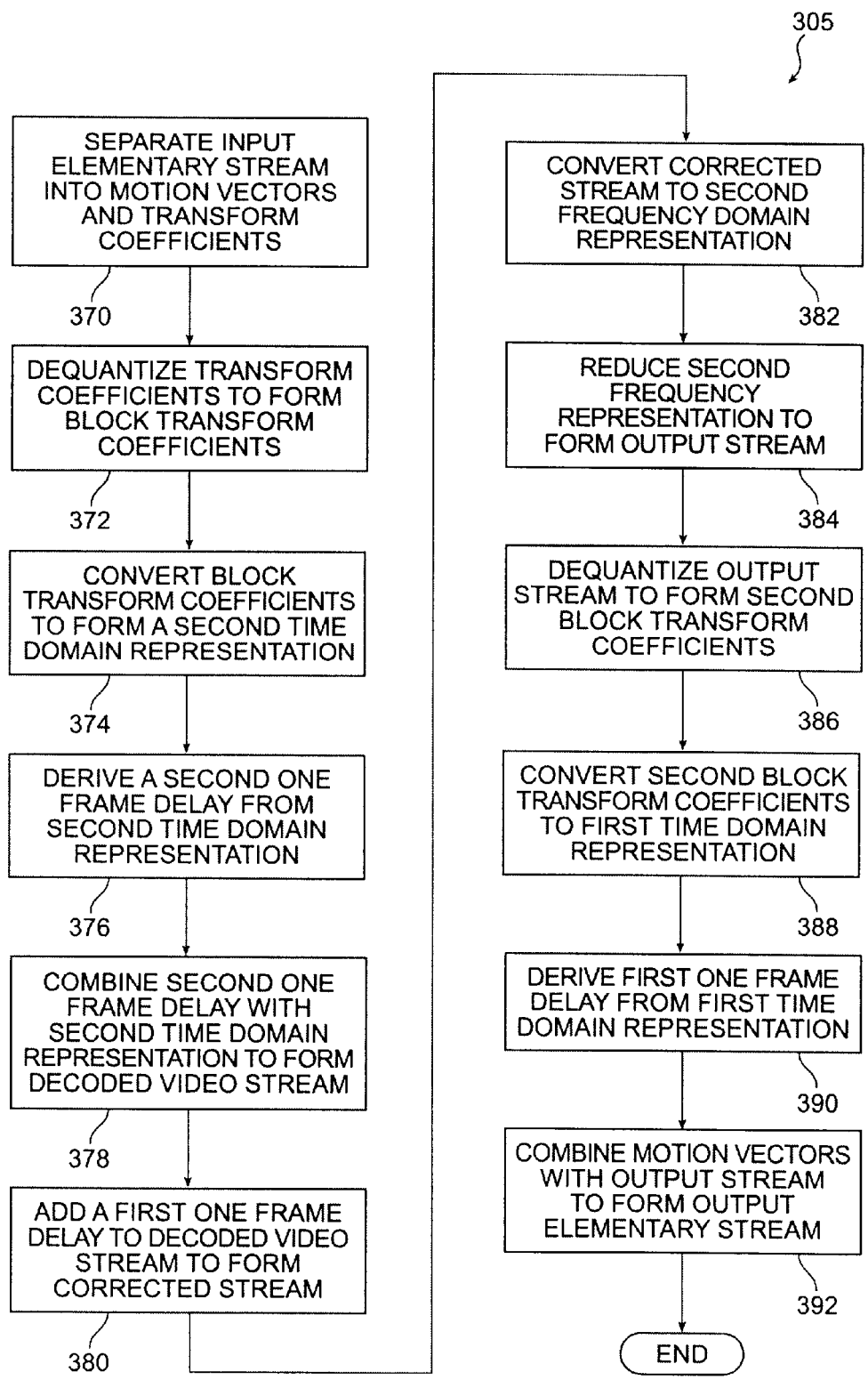

FIG. 5C depicts a flowchart 305 of simplified process steps incorporated into various components in an alternative embodiment according to the invention for transcoding an input elementary stream having a plurality of image frames, some of which may be intra frames (I), predicted frames (P) or bidirectional frames (B), into an output elementary stream having a characteristic data rate which is different from the input elementary stream. In a step 370, input elementary stream 50 is separated into a plurality of motion vectors 112 and a plurality of transform coefficients 114. In one embodiment the transform coefficients are discrete cosine transform (DCT) coefficients. Next, in a step 372, the transform coefficients 114 are dequantized to form a plurality of block transform coefficients 116. In a step 374, plurality of block transform coefficients 116 is converted into a second time domain representation 136. Then, in a step 376, a second one frame delay 139 is derived from the second time domain representation 136. Then in a step 378, the second one frame delay 139 is combined with the second time domain representation 136 to form a decoded video stream 117. Then, in a step 380, the decoded video stream 117 is combined with a first one frame delay 129 generated in a step 390 to form a corrected stream 118. Next, in a step 382, corrected stream 118 is converted to a second frequency stream 119. Then, in a step 384, second frequency stream 119 is reduced to a target output data rate to form an output stream 120. Next, in a step 386, the output stream 120 is converted to form a second plurality of block transform coefficients 122. Then, in a step 388, the second plurality of block transform coefficients 122 is converted to a first time domain representation 126. Next, in a step 390, the first one frame delay 129 is derived from first time domain representation 126 in accordance with motion vectors 112. Finally, in a step 392, motion vectors 112 are combined with the output stream 120 formed in reducing step 384 to form an output elementary stream 72.

The present invention has been described in terms of specific embodiments comprised of a combination of hardware and software. Other embodiments may be created by more closely combining the various functions which make up the invention. For example, coding of an input stream and decoding of an input stream may be combined into a single form factor using methods such as incorporating both processes onto a single silicon wafer, or in a single software process. Alternatively, embodiments may be created by more distantly separating the various functions which make up the invention. Other and different processes or hardware may be substituted for those of the specific embodiments enumerated here.

5.0 Conclusion

In conclusion the present invention provides for an apparatus for transcoding to provide transmission flexibility to pre-encoded bit streams by reducing the characteristic bit rates according to either channel capacity or user demand. One advantage is that some embodiments are relatively low cost. Another advantage provided by this approach is that image drift errors are eliminated from the output elementary stream.

Other embodiments of the present invention and its individual components will become readily apparent to those skilled in the art from the foregoing detailed description. As will be realized, the invention is capable of other and different embodiments, and its several details are capable of modifications in various obvious respects, all without departing from the spirit and the scope of the present invention. Accordingly, the drawings and detailed description are to be regarded as illustrative in nature and not as restrictive. It is therefore not intended that the invention be limited except as indicated by the appended claims.

What is claimed is:

1. A telecommunication method in a cable head end, said method comprising:

providing a first constant bit rate information stream comprising a plurality of variable bit rate streams, each of said variable bit rate streams corresponding to a program;

removing one or more of said variable bit rate streams using a transcoding method from said first constant bit rate stream;

converting said first constant bit rate stream without said one or more variable bit rate streams to a second constant bit rate stream; and transferring said a second constant bit rate stream to a user location.

2. The method of claim 1 wherein inserting one or more second bit rate streams into said first constant bit rate stream to provide a resulting constant bit rate stream.

3. The method of claim 1 wherein said first digital signal comprises multiple first constant bit rate streams, each of said multiple first constant bit rate streams comprising a plurality of variable bit rate streams.

4. The method of claim 1 further comprising a step of receiving said second constant bit rate stream by a user.

5. The method of claim 3 wherein said second digital signal comprises multiple constant bit rate streams, each of said multiple constant bit rate streams comprising a plurality of variable bit rate streams.

6. The method of claim 3 wherein said second digital signal comprises an MPEG-2 transport bit stream.

7. The method of claim 1 wherein said first digital signal comprises an MPEG-2 transport bit stream.

8. The method of claim 1 wherein said cable head end is a digital cable head end.

9. The method of claim 1 wherein said source comprises multiple satellite sources.

10. The method of claim 1 wherein said step of removing comprising a step of transcoding said first digital signal.

11. The method of claim 1 wherein further comprising a step of remultiplexing to provide said second digital signal.

12. The method of claim 1 wherein said second digital signal comprises a local channel.

* * * * *